(12) United States Patent
Lin

(10) Patent No.: US 8,950,435 B2
(45) Date of Patent: Feb. 10, 2015

(54) PRESSURE COMPENSATION DEVICE

(75) Inventor: Wenjuan Lin, Far Hills, NJ (US)

(73) Assignee: Niagara Conservation Corp., Fort Worth, TX (US)

( * ) Notice: Subject to any disclaimer, the term of this patent is extended or adjusted under 35 U.S.C. 154(b) by 519 days.

(21) Appl. No.: 13/382,421

(22) PCT Filed: Jul. 9, 2010

(86) PCT No.: PCT/US2010/041551
§ 371 (c)(1),
(2), (4) Date: Jan. 5, 2012

(87) PCT Pub. No.: WO2011/006082
PCT Pub. Date: Jan. 13, 2011

(65) Prior Publication Data
US 2012/0103451 A1    May 3, 2012

(30) Foreign Application Priority Data

Jul. 9, 2009  (CN) ...................... 2009 2 0139382 U

(51) Int. Cl.
| | | |
|---|---|---|
| *F15D 1/02* | (2006.01) | |
| *E03C 1/084* | (2006.01) | |
| *F15D 1/00* | (2006.01) | |
| *F16L 55/027* | (2006.01) | |

(52) U.S. Cl.
CPC ............... *E03C 1/084* (2013.01); *F15D 1/001* (2013.01); *F16L 55/02718* (2013.01)
USPC ........................... 138/44; 239/428.5; 137/833

(58) Field of Classification Search
CPC ...... E03C 1/084; E03C 1/08; F16L 55/07218; F16L 55/02709; F15D 1/001
USPC .................... 138/44, 40; 239/428.5; 137/833
See application file for complete search history.

(56) References Cited

U.S. PATENT DOCUMENTS

| | | | | |
|---|---|---|---|---|
| 3,326,242 A | * | 6/1967 | Parkison | 138/46 |
| 3,545,492 A | * | 12/1970 | Scheid, Jr. | 138/42 |
| 3,996,025 A | * | 12/1976 | Gulden | 48/107 |
| 5,467,929 A | * | 11/1995 | Bosio | 239/428.5 |
| 5,664,760 A | * | 9/1997 | Army et al. | 251/118 |
| 5,762,107 A | * | 6/1998 | Laws | 138/44 |
| 6,065,498 A | | 5/2000 | Campau | |

(Continued)

FOREIGN PATENT DOCUMENTS

| | | |
|---|---|---|
| DE | 102005001419 B3 | 5/2006 |
| FR | 2128861 A1 | 10/1972 |

(Continued)

OTHER PUBLICATIONS

International Search Report, PCT/US2010/041551, dated Oct. 19, 2010.

*Primary Examiner* — J. Casimer Jacyna
(74) *Attorney, Agent, or Firm* — Lerner, David, Littenberg, Krumholz & Mentlik, LLP

(57) ABSTRACT

Pressure compensators (1) for stabilizing a flow of water are disclosed. The pressure compensator (1) includes water compensating channels (3) formed on the outer periphery of their body (2), and flow orifices (4) passing through the pressure compensator (1), so that the water compensating channels and the flow orifices control the flow rate of the water at varying pressures. The body of the pressure compensator (1) preferably comprises a flexible material, such as rubber.

9 Claims, 10 Drawing Sheets

(56) References Cited

U.S. PATENT DOCUMENTS

| | | |
|---|---|---|
| 7,252,248 B2 | 8/2007 | Cutler |
| 2006/0096650 A1* | 5/2006 | Sawchuk et al. ............... 138/39 |
| 2007/0108314 A1 | 5/2007 | Cutler |
| 2008/0169361 A1* | 7/2008 | Lacher et al. .............. 239/428.5 |

FOREIGN PATENT DOCUMENTS

| | | |
|---|---|---|
| GB | 141489 A | 4/1920 |
| GB | 1375908 A | 12/1974 |
| JP | 2006291987 A | 10/2006 |

* cited by examiner

PRESSURE COMPENSATION DEVICE

CROSS-REFERENCE TO RELATED APPLICATIONS

This application claims priority from Chinese Patent Application No. 200920139382.0 filed on Jul. 9, 2009, in the Chinese Intellectual Property Office, the disclosure of which is incorporated herein by reference in its entirety.

FIELD OF THE INVENTION

The present invention relates to flow compensators. More particularly, the present invention relates to miniature flow or pressure compensators which are used as water saving devices. Still more particularly, the present invention relates to pressure compensators which are capable of maintaining flow rates in the face of changes in water pressure in devices such as shower heads and kitchen aerators.

BACKGROUND OF THE INVENTION

As various energy resources become rarer, such as, for example, water resources, the public has become far more conscious of the need for energy savings, as well as the need for environmental protection. Thus, water saving products have been widely accepted in various areas. As an example, water saving aerator devices are now used far more frequently in the daily life of the public than has previously been the case. On the other hand, however, the present state of the art can only realize water savings by limiting the water flow rate, but has not been fully able to maintain stable flow rates under changing water pressures, and thus their water saving efficiency has not been fully satisfactory.

It has been known to employ flow compensators in devices such as kitchen aerators. For example, the assignee of the present application is also the assignee of U.S. Pat. No. 7,252,248 ("the '248 Patent"), the entire disclosure of which is incorporated herein by reference thereto. This patent discloses a faucet aerator which incorporates a flow compensator to permit higher flow rates of water at lower water pressures flowing through the aerator itself. The flow compensator shown in the '248 Patent is mounted in the flow path of the water through the aeration device and includes a plurality of spaced-apart water openings for the flow of water therein.

Other liquid control devices are known in the art such as that of U.S. Pat. No. 6,065,498. This patent includes a flow control device which provides variable resistance to liquid flow through a flow passage. In this device, however, a vortex flow path is used within a generator as the liquid flows into a housing so that as the inlet pressure increases the flow of water decreases therein.

The search has thus continued for improved small-size pressure compensators for use in aerators of various kinds.

SUMMARY OF THE INVENTION

In accordance with the present invention, this and other objects have now been realized by the discovery of a pressure compensator for stabilizing a flow of water comprising a pressure compensator body including an upper surface, a lower surface, and an outer periphery, a plurality of water compensating channels formed in the outer periphery of the pressure compensator body, and a plurality of flow orifices passing through the pressure compensator body from the upper surface to the lower surface thereof, whereby the plurality of water compensating channels and the plurality of flow orifices control the flow rate of the water in the pressure compensator body at various water pressures. In a preferred embodiment, the pressure compensator body includes a plurality of columns disposed on the lower surface of the pressure compensator body for interacting with the plurality of water compensating channels and the plurality of the orifices to control the flow rate of the water in the pressure compensating body at various water pressures.

In accordance with a preferred embodiment of the pressure compensator of the present invention, the pressure compensator body comprises a flexible material. Preferably, the flexible material comprises an elastomer, preferably rubber, and most preferably nitrile butadiene rubber.

In accordance with another embodiment of the pressure compensator of the present invention, the pressure compensator body is in the shape of a quincunx. Preferably, the water compensating channels have a concave arcuate shape evenly distributed around the outer periphery of the pressure compensator body.

In accordance with another embodiment of the pressure compensator of the present invention, the lower portion of the pressure compensator body has a cylindrical shape, and the upper portion of the pressure compensator body has a conical shape. Preferably, the plurality of flow orifices are disposed in the conical surface.

In accordance with another embodiment of the pressure compensator of the present invention, the pressure compensator body has a height of less than about 10 mm, and in another embodiment a width of less than about 12 mm.

BRIEF DESCRIPTION OF THE DRAWINGS

The present invention may be more fully appreciated with reference to the following detailed description, which in turn refers to the figures in which.

DETAILED DESCRIPTION

The primary object of the pressure compensators of the present invention in improving over the prior art is to maintain flow rates as water pressure changes. Thus, within a certain predescribed range of pressure variation the flow rate can now be maintained in order to stabilize the water saving effects realizable with these devices.

The pressure or flow compensators of the present invention are dynamically operated devices which determine the flow rate passing therethrough by flexing or compressing as the water pressure increases. That is, at low water pressures flowing therethrough, the compensator is in a relaxed position permitting the maximum allowable flow of water therethrough. As the water pressure increases, however, the flow compensator itself begins to compress, thus reducing the size of the openings which water can pass through, thereby reducing the amount of water flowing therethrough. In this manner, the flow compensator can be designed to maintain its rated flow rate generally between pressures of from 30 to 80 psi. As the flow compensator compresses, the channels through which the water passes are distorted, again allowing the constant flow rate to be maintained.

In order to meet these requirements, the compensators of the present invention are preferably made of a rubber compound, most preferably a nitrile butadiene rubber (NBR). These rubbers are a family of unsaturated copolymers of 2-propene nitrile and various butadiene monomers (1,2-butadiene and 1,3-butadiene). While the physical and chemical properties of the NBRs can vary somewhat depending on the polymer's composition of nitrile, such that the lower the nitrile content, the greater the flexibility of the material, this synthetic type of rubber is generally resistant to oil, fuel, and other chemicals, is quite resilient, and is generally able to withstand a range of temperatures of from −40° C. to +108° C. In addition, the manufacture of these compensator materials can be generally accomplished by injection molding processes common for such rubber-type products.

The particular configuration and shape of the flow compensators of the present invention, particularly as compared to prior art flow compensators, greatly increases the utility and versatility of these products. In particular, they can now provide for control of flow rates even lower than those which are applicable to prior art products, which are generally limited to minimal flow rates of about 1 and 1.25 gallons per minute. The pressure compensator devices of the present invention, on the other hand, can handle various flow rates including flow rates of 0.5, 1.25, 1.5, 1.75, and 2.0 gallons per minute, and the like.

Figure 1:
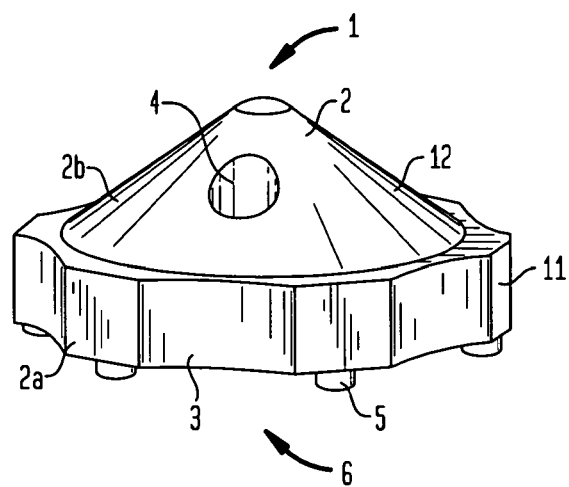
FIG. 1 is a side, perspective view of a pressure compensator in accordance with the present invention.
Figure 2:
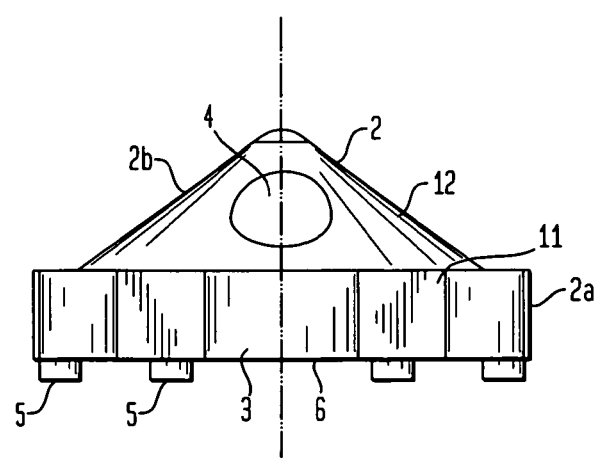
FIG. 2 is a side, elevational view of the pressure compensator shown in FIG. 1.
Figure 3:
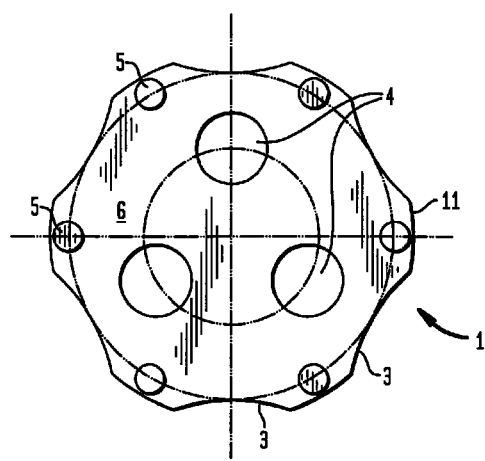
FIG. 3 is a bottom, elevational view of the pressure compensator shown in FIG. 1.
Figure 4:
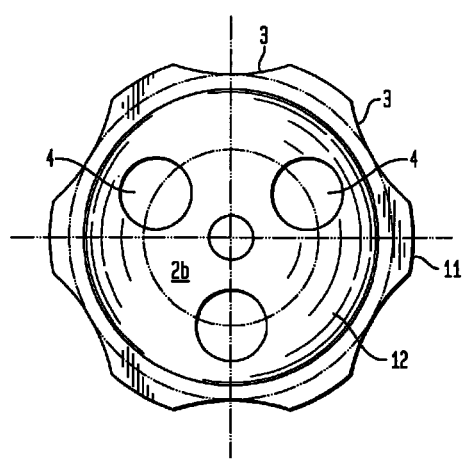
FIG. 4 is a top, elevational view of the pressure compensator shown in FIG. 1.

Referring to FIGS. 1-4, the miniature flow compensator 1 shown therein includes a body 2 which includes a lower, generally disc-shaped portion 2a and an upper, conical portion 2. The lower, disc-shaped portion 2a includes a number of concave water compensating channels 3 evenly distributed around the edges of the body portion 2a. Thus, as the water flows in a vertical, downward direction as seen in FIG. 1, onto the upper, conical portion 2b, this allows the water to pass through these water compensating channels 3. The body 2 also includes a plurality of flow orifices 4 passing through the body 2, allowing water to also pass entirely through the body 2. Furthermore, on the bottom surface of the flow compensator 1 are a plurality of extending columns 5 which interact with the water compensating channels for control of flow alterations. The presence of the flow compensating channels 3, in combination with columns 5, specifically allows for increased flow-through of water at low pressures, therefore providing for higher flow, in terms of gallons per minute, than restrictive type devices. Thus, in conjunction with the through holes or flow orifices 4 passing through the body 2, it is now possible to provide controlled balance to the flow rate as the water pressure increases. As water pressure thus increases, the overall flow compensator 1 begins to flex and both the outer cylindrical surfaces 11 between the water compensating channels 3, as well as the surface of the water compensating channels themselves, begin to seal off with the adjacent wall of the flow compensator seat in which the flow compensator 1 is contained (see discussion which follows). The equal spacing of the water compensating channels, as well as the columns 5 in the overall compensator device itself, allows for a continued uniform distribution of water flow, therefore lowering the potential for uneven flow spikes, which would normally increase with turbulent flow therein.

It is, however, also possible for the flow compensator to include other shapes such as spherical, cubical, or other such forms, although the quinconx shape shown in FIGS. 1-4 is a preferred embodiment of this invention. Furthermore, the water compensating channels 3 can have a squared, arcuate or concave arcuate shape, as well as other such forms which are evenly distributed around the edge of the body itself.

In order to stabilize the flow rates, the body 2 can have a shape as shown in FIGS. 1-4, or other shapes as discussed above. The shape shown thus includes the cylindrical or disc-shaped bottom 2a, and the conical upper surface 2b formed thereon, with the flow orifices 4 passing through the conical surface 26. In the embodiment shown in FIGS. 3 and 4, the flow orifices include three evenly distributed flow orifices passing through the body 2. Other numbers of orifices are, however, possible in other embodiments of this invention.

Figure 5:
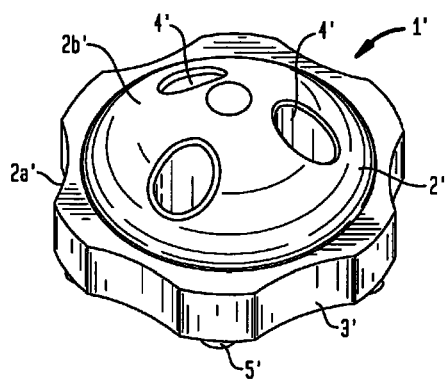
FIG. 5 is a top, perspective view of another pressure compensator in accordance with the present invention.
Figure 6:
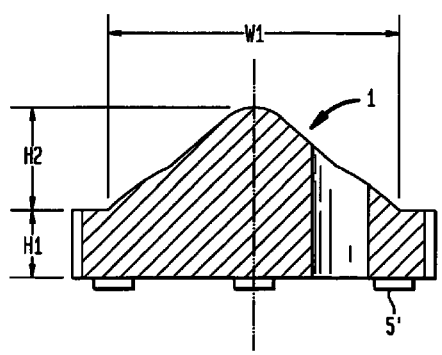
FIG. 6 is a side, elevational, sectional view of the pressure compensator shown in FIG. 5.
Figure 7:
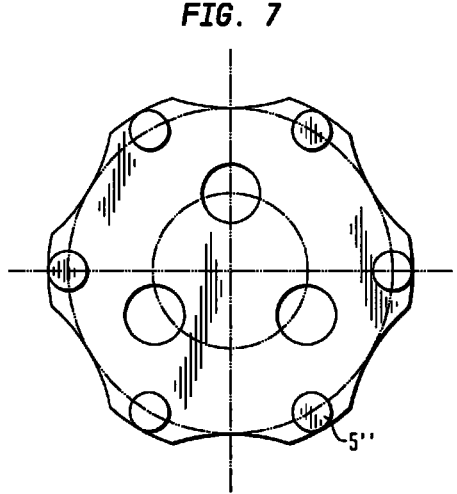
FIG. 7 is a bottom, elevational view of the pressure compensator shown in FIG. 5.

Turning to FIG. 5, the pressure compensator 1' shown therein is similar in shape to the pressure compensator shown in FIG. 1. It thus also includes a body 2' which includes lower, disc-shaped or cylindrical portion 2a and an upper, conical-shaped portion 2b, in which the lower, disc-shaped portion 2a includes side water compensating channels 3' having concave surfaces 3' which are evenly distributed around the edges of the body 2'. Furthermore, once again the body 2' includes flow orifices 4' passing therethrough. In addition, the bottom surface of the flow compensator 1' includes columns 5' supporting this device. As for the dimensions of this flow compensator 1', these can be varied depending on the anticipated flow throughput thereof. With these miniature pressure compensators, however, it is preferred that they have an overall height of less than about 10 mm, preferably less than about 5 mm, and an overall width of less than about 12 mm, preferably less than abut 10 mm. Thus, in the case of a device intended for a water throughput of 1.0 gallons per minute, referring to FIG. 6, the height H1 of the outer sidewall of the lower, disc-shaped portion 2a' of the pressure compensator 1' will be about 1.8 mm, while the height H2 of the upper conical surface 2b' of the compensator body 2' will be about 2.84 mm, so that the total height of the pressure compensator 1' will be about 4.64 mm. These dimensions will apply for such a device having an intended throughput ranging from 1.0, 1.5 and 2.0 gpm. Similarly, the width W1 of this device, in all three instances, will be about 8.2 mm. Referring to FIGS. 6 and 7, the columns 5' on the bottom surface of a device having a throughput of 1.0, 1.5 or 2.0 gpm, will include a diameter of about 1 mm.

Figure 8:
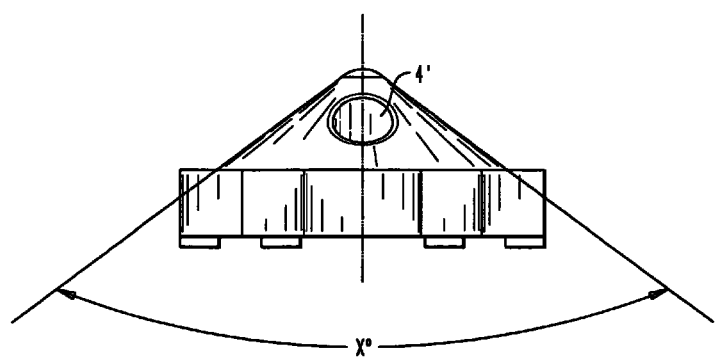
FIG. 8 is a side, elevational view of the pressure compensator shown in FIG. 5.
Figure 9:
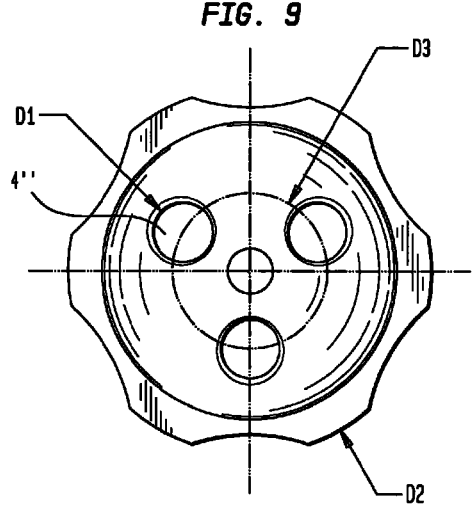
FIG. 9 is a top, elevational view of the pressure compensator shown in FIG. 5.

However, the height of these columns 5' will be about 0.2 mm for a throughput of 1.0 gpm; about 0.3 mm for a throughput of 1.5 gpm; and about 0.35 mm for a pressure compensator having a throughput of 2.0 gpm. In the case of each of these flow compensators, as shown in FIG. 8, the angle of the slope of the upper, conical surface 2b' subtends an arc X of about 106°. Finally, referring to FIG. 9, the diameter D1 of the flow orifices 4' in the case of such a device with an anticipated throughput of 1.0 gpm, will be about 1.3 mm; in the case of a device with a throughput of 1.5 gpm, about 1.65 mm; and for a device with an anticipated throughput of 2.0 gpm, the diameter will be about 1.9 mm. In each of these cases, the diameter D2 of the lower, disc-shaped portion 2a' corresponding to height H1 will be about 10 mm, and the diameter D3 of a circle subscribing the centers of each of the three flow orifices 4' will be about 4.3 mm.

Figure 10:
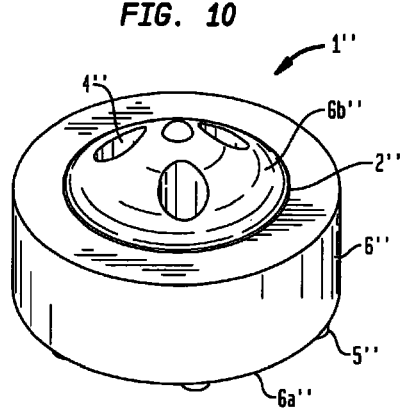
FIG. 10 is a side, perspective view of another pressure compensator in accordance with a the present invention.
Figure 11:
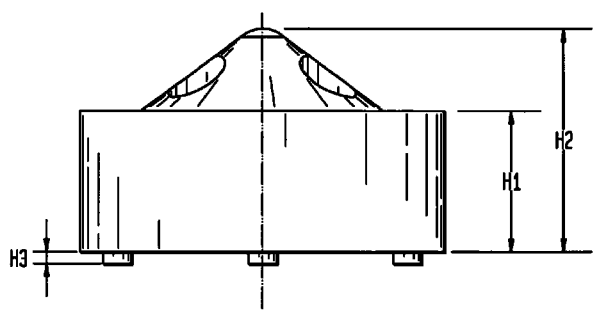
FIG. 11 is a side, elevational view of the pressure compensator shown in FIG. 10.
Figure 12:
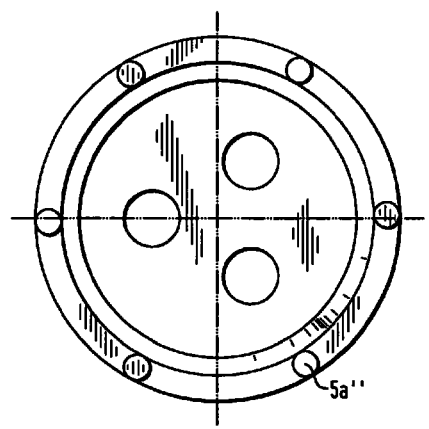
FIG. 12 is a bottom, elevational view of the pressure compensator shown in FIG. 10.
Figure 13:
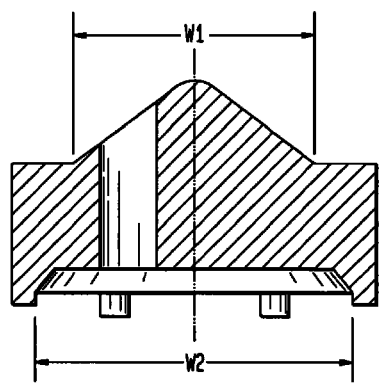
FIG. 13 is a side, elevational, sectional view of the pressure compensator shown in FIG. 10.
Figure 14:
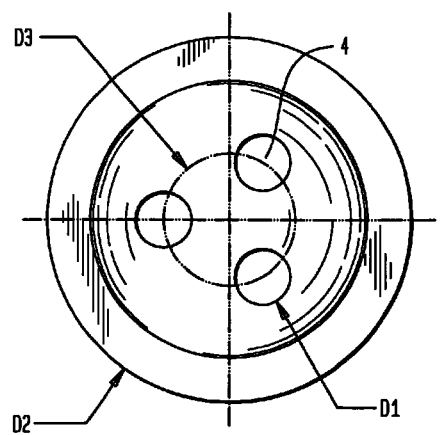
FIG. 14 is a top, elevational view of the pressure compensator shown in FIG. 10.

Turning to FIG. 10, another flow compensator 1" is shown therein. This device has a slightly different shape from that shown in FIGS. 1-9. In this case, a cylindrical outer surface for the body 2" is shown. Thus, other than the smooth sidewall 6" from the lower, cylindrical surface 6a", this flow compensator 1" again includes an upper conical surface 6b" with flow orifices 4", as well as columns 5" supporting the base thereof. In this case, as can be seen in FIG. 11, in a device having an anticipated flow throughput of 1.5 gpm, the height H1 of the lower, cylindrical portion 6a" will be about 4.6 mm, and the overall height H2 of the flow compensator 1" will be about 7.7 mm. As can be seen in FIGS. 11 and 12, the columns 5" in this case will have a height H3 of about 0.4 mm. Referring to FIG. 13, the width W1 corresponding to the diameter of the upper conical portion 6b" of the pressure compensator 1" will be about 8.4 mm, and the width W2 corresponding to the distance between the inner surface of the columns 5" across the base of the pressure compensator 1" will be about 9.9 mm. Finally, as can be seen in FIG. 14, the diameter D1 of the flow orifices 4" in this device will be about 1.83 mm, while the diameter D2 of the lower, cylindrical portion 6a" will be about 11.85 mm, while the diameter D3 of a circle circumscribing the centers of all of the flow orifices 4" will be about 4.3 mm.

Figure 15:
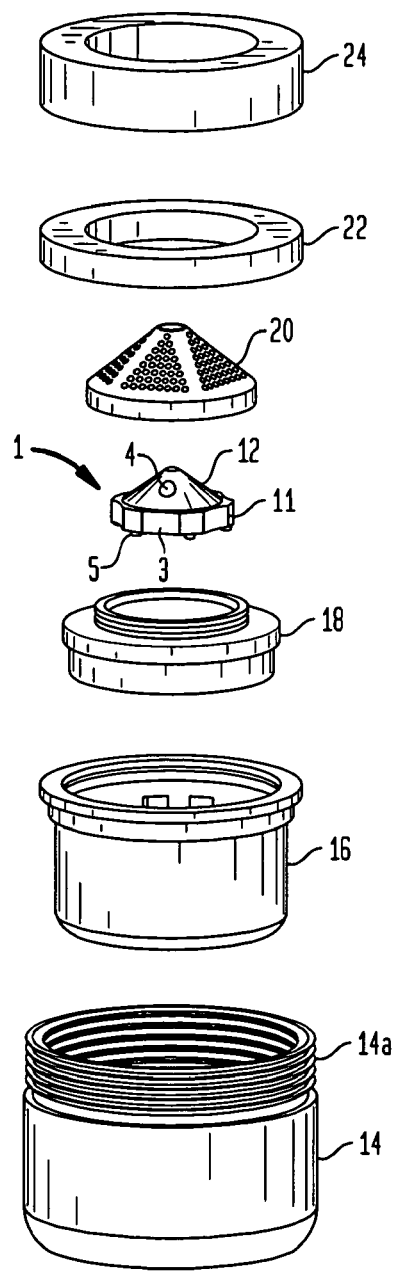
FIG. 15 is a side, perspective, exploded view of a pressure compensator in accordance with the present invention installed in an aeration device.
Figure 16:
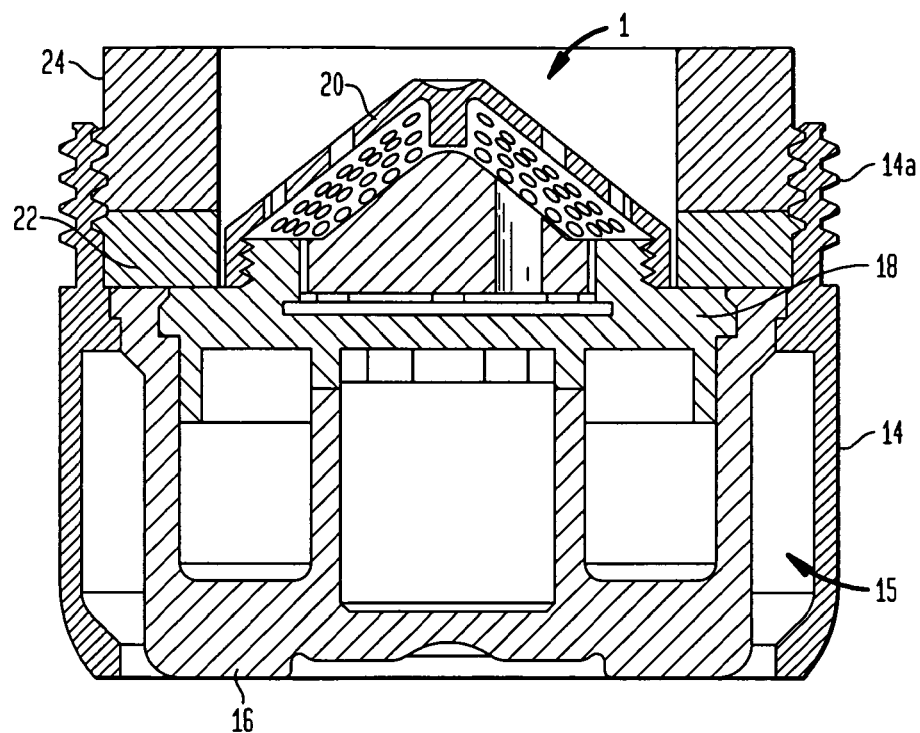
FIG. 16 is a side, elevational, sectional view of the pressure compensator of the present invention installed in an aeration body.

Turning to FIG. 15, the flow compensator 1 is shown in conjunction with the major components of an aeration device. These, as shown in FIGS. 15 and 16, include an outer body portion 14 including an upper threaded portion 14a which can be threaded to the tap of a sink, for example. The lower surface of the body portion 14 includes an open area 15 as shown in FIG. 16. Contained within the body portion 14 is a water basket 16 through which the water spray will exit the device. The bottom surface of the water basket 16 thus includes a plurality of spray openings or the like. Mounted on the upper surface of the water basket 16 is a platform member 18 which fits within the upper open area of the water basket 16. The upper surface of the platform member 18 includes an indented surface within which can fit the pressure compensator 1 mounted therein. On top of the pressure compensator 1 is a corresponding conical-shaped filter 20 for initially filtering the flow of water before it enters the flow compensator itself. The device is finished by means of flow rings 22 and 24, maintaining all of the parts within the body 14 itself. In addition to use of the compensators of the present invention in connection with the aeration devices as shown in FIGS. 5 and 6, these flow compensators can also be utilized within the actual body of a shower head, for example, or in the inlet of a hand-held shower handle, or other such devices.

Figure 17:
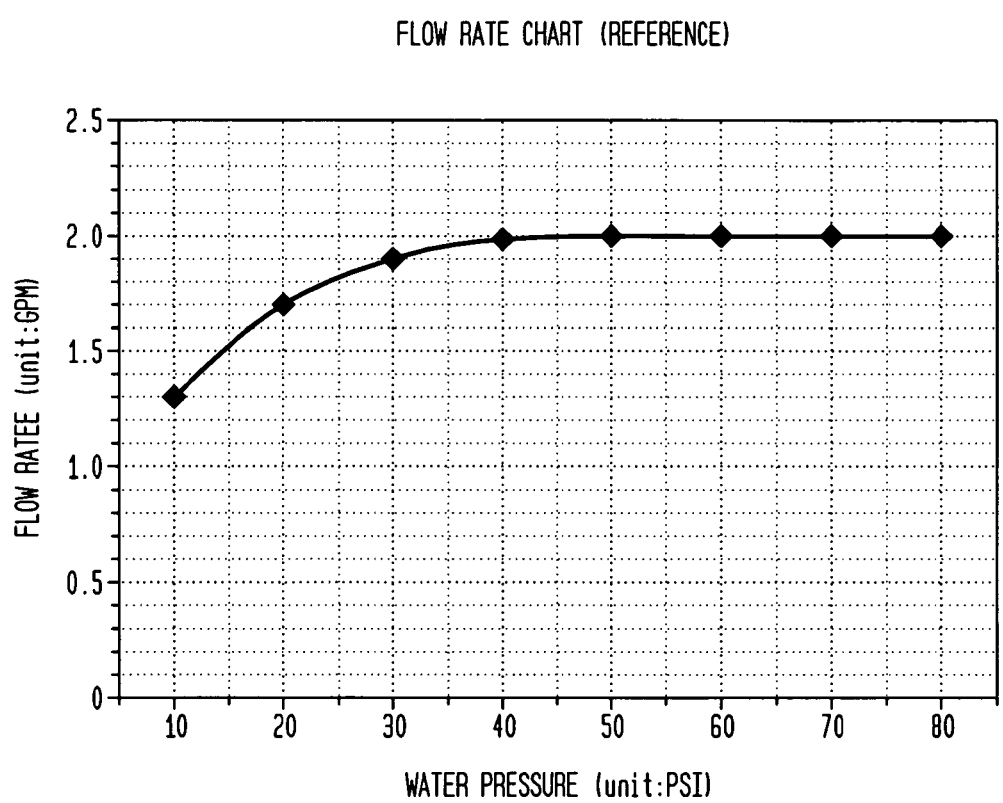
FIG. 17 is a graphical representation of the relationship between flow rate and water pressure change utilizing the pressure compensator of the present invention.

Finally, referring to FIG. 17, the relationship between the pressure flow rate change using a flow compensator as shown in FIGS. 1-4, for example, is set forth, demonstrating the stabilization and water saving effects which can be realized in accordance with the present invention. Referring specifically to FIG. 17, it can thus be seen that at lower pressures, when the compensators of this invention are in a relaxed state, water is permitted to flow freely through and around the compensator. As the pressure increases, as noted above, the compensator begins to flex, which action itself initiates sealing off of the side surfaces of the compensator, i.e., between the water compensating channels 3 thereof, and also alters the shape of the flow orifices 4 which pass through the body of the compensator. As the pressure increases further, the compensator itself reaches its elastic state at which point the side portions of the compensator are completely sealed off, and all of the water passes only through the flow orifices 4. Thus, the water compensating channels 3 bulge outwardly to seal off the entire side wall surface thereof. At this point, the flow rate is maintained because increased pressure at this point alters the shape of the flow orifices themselves, which become more elliptical in shape as compared to their initial circular shape. Furthermore, in view of the conical shape of the upper surface 12 of the flow compensator, as the water pressure increases on the upper surface, pushing down on the compensator body, the cross-section of the flow orifices is reduced. Thus, the greater the pressure and the further reduction in this cross-section, the greater maintenance of the flow rate through the remainder of the pressure scale, again as shown in FIG. 17.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A pressure compensator for stabilizing a flow of water comprising a pressure compensator body comprising a flexible material and including an upper portion including an upper surface having a conical shape, a lower portion including a lower surface having a cylindrical shape, and an outer periphery, a plurality of concave water compensating channels formed in said outer periphery of said pressure compensator body, and a plurality of flow orifices passing through said pressure compensator body from said upper surface to said lower surface thereof, whereby the shape of said plurality of concave water compensating channels and said plurality of flow orifices is altered so as to control the flow rate of said water in said pressure compensator body at various water pressures.

2. The pressure compensator of claim 1 wherein said pressure compensator body includes a plurality of columns disposed on said lower surface of said pressure compensator body for interacting with said plurality of concave water compensating channels and said plurality of flow orifices to control the flow rate of said water in said pressure compensating body at various water pressures.

3. The pressure compensator body of claim 1 wherein said flexible material comprises rubber.

4. The pressure compensator body of claim 3 wherein said rubber comprises nitrile butadiene rubber.

5. The pressure compensator of claim 1 wherein said pressure compensator body is in the shape of quincunx.

6. The pressure compensator of claim 5 wherein said concave water compensating channels are evenly distributed around the outer periphery of said pressure compensator body.

7. The pressure compensator of claim 1 wherein said plurality of flow orifices are disposed in said upper surface of said upper portion having said conical shape.

8. The pressure compensator body of claim 1 having a height of less than about 10 mm.

9. The pressure compensator body of claim 1 having a width of less than about 12 mm.

* * * * *